US012275397B2

(12) United States Patent
Ahn (10) Patent No.: US 12,275,397 B2
(45) Date of Patent: Apr. 15, 2025

(54) METHOD, APPARATUS, STORAGE MEDIUM, AND VEHICLE FOR PREVENTING BLIND SPOT COLLISION

(71) Applicant: HYUNDAI MOBIS CO., LTD., Seoul (KR)

(72) Inventor: Hyun Chan Ahn, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 197 days.

(21) Appl. No.: 17/967,042

(22) Filed: Oct. 17, 2022

(65) Prior Publication Data

US 2023/0174057 A1 Jun. 8, 2023

(30) Foreign Application Priority Data

Dec. 8, 2021 (KR) ........................ 10-2021-0174481

(51) Int. Cl.
*B60W 30/09* (2012.01)
*B60W 10/18* (2012.01)
*B60W 10/20* (2006.01)
*B60W 30/12* (2020.01)
*B60W 50/14* (2020.01)

(52) U.S. Cl.
CPC ............ *B60W 30/09* (2013.01); *B60W 10/18* (2013.01); *B60W 10/20* (2013.01); *B60W 30/12* (2013.01); *B60W 50/14* (2013.01); *B60W 2050/146* (2013.01); *B60W 2420/403* (2013.01); *B60W 2554/402* (2020.02); *B60W 2554/4041* (2020.02); *B60W 2710/18* (2013.01); *B60W 2710/202* (2013.01)

(58) Field of Classification Search
None
See application file for complete search history.

(56) References Cited

U.S. PATENT DOCUMENTS

| | | | |
|---|---|---|---|
| 8,253,550 B2 * | 8/2012 | Wu ........................ | G09F 13/12 340/905 |
| 10,569,770 B1 * | 2/2020 | You ................... | B60W 30/0956 |
| 10,824,148 B2 * | 11/2020 | Russell ................ | G05D 1/0088 |
| 11,423,663 B2 * | 8/2022 | Hashimoto .......... | G06V 10/764 |
| 11,529,956 B2 * | 12/2022 | Kim ..................... | B60W 50/082 |
| 2011/0260888 A1 * | 10/2011 | Fossier .................... | G09F 9/33 340/933 |
| 2011/0267203 A1 * | 11/2011 | Lee ........................ | G08G 1/167 340/928 |
| 2015/0015712 A1 * | 1/2015 | Sempuku ............... | H04N 7/183 348/148 |
| 2015/0154863 A1 * | 6/2015 | Fossier .................. | G09F 13/12 340/907 |
| 2016/0152234 A1 * | 6/2016 | Kim ..................... | B60W 10/20 701/41 |

(Continued)

*Primary Examiner* — Jonathan M Dager
(74) *Attorney, Agent, or Firm* — NSIP Law (57) ABSTRACT

A method of preventing a blind spot collision includes recognizing a reflector installed on a road using a front camera, determining whether at least one other vehicle image exists in the reflector, determining whether the at least one other vehicle is a preceding vehicle or an opposite vehicle through image analysis when the at least one other vehicle image exists in the reflector, generating a braking command when the at least one other vehicle is the preceding vehicle, and generating a steering torque for maintaining a lane when the at least one other vehicle is the opposite vehicle.

12 Claims, 5 Drawing Sheets

(56) References Cited

U.S. PATENT DOCUMENTS

| | | | |
|---|---|---|---|
| 2016/0179093 A1* | 6/2016 | Prokhorov | B60W 30/18154 |
| | | | 701/2 |
| 2016/0342850 A1* | 11/2016 | Elimalech | G08G 1/0141 |
| 2018/0018878 A1* | 1/2018 | Kitano | G05D 1/024 |
| 2018/0178800 A1* | 6/2018 | Ishii | G08G 1/09623 |
| 2018/0181139 A1* | 6/2018 | Ishii | G06V 20/58 |
| 2018/0181824 A1* | 6/2018 | Ishii | G06V 20/58 |
| 2018/0342046 A1* | 11/2018 | Tomatsu | G01S 19/14 |
| 2019/0152523 A1* | 5/2019 | Hajika | B62D 6/005 |
| 2019/0303693 A1* | 10/2019 | Watanabe | G08G 1/096791 |
| 2020/0207358 A1* | 7/2020 | Katz | G02B 27/0093 |
| 2021/0082090 A1* | 3/2021 | Herman | G06T 5/94 |
| 2021/0188356 A1* | 6/2021 | Goto | B62D 6/00 |
| 2021/0213945 A1* | 7/2021 | Schamburek | B60W 30/18163 |
| 2022/0297688 A1* | 9/2022 | Park | G01S 15/931 |
| 2022/0410881 A1* | 12/2022 | Young | B60W 30/095 |
| 2023/0166743 A1* | 6/2023 | Heck | G05B 13/027 |

* cited by examiner

METHOD, APPARATUS, STORAGE MEDIUM, AND VEHICLE FOR PREVENTING BLIND SPOT COLLISION

CROSS-REFERENCE TO RELATED APPLICATION

Pursuant to 35 U.S.C. § 119 (a), this application claims the benefit of earlier filing date and right of priority to Korean Application No. 10-2021-0174481, filed on Dec. 8, 2021, the contents of which are hereby incorporated by reference herein in their entirety.

BACKGROUND

Field

The present embodiments are applicable to vehicles of all fields, and more specifically, to a system for preventing a collision in a vehicle blind spot.

Discussion of the Related Art

The Society of Automotive Engineers (SAE), the American Society of Automotive Engineers, subdivides autonomous driving levels into six levels, for example, from level 0 to level 5. However, full automation of level 5 has not yet been commercialized.

On the other hand, among the road environments, an accident rate in a blind spot where a sharp curve occurs is still higher than that of a general road.

In order to solve this problem, according to a related art, a reflector is installed in a sharp curve blind spot or the like.

However, there are many cases in which a driver fails to recognize the existence of a reflector installed at the corner of the sharp curve blind spot, and even if the driver recognizes the existence of the reflector itself, driving stability is still seriously reduced in the course of directly checking the reflector with eyes.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Accordingly, embodiments of the present disclosure are directed to a system for preventing a collision in a vehicle blind spot that substantially obviates one or more problems due to limitations and disadvantages of the related art.

To solve the above-described problems, one embodiment of the present disclosure intends to provide a system for preventing collision in a sharp curve blind spot, in which a driver does not need to actually check a reflector.

Another embodiment of the present disclosure intends to provide a different algorithm depending on whether the other vehicle recognized in a reflector is a preceding vehicle or an opposite vehicle (i.e., a vehicle running on the opposite lane or in the opposite direction).

Further embodiment of the present invention intends to provide a system for adaptively changing a Time To Collison (TTC) in consideration of a type of another vehicle recognized in a reflector.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

In one general aspect, a method of preventing a blind spot collision includes recognizing a reflector installed on a road using a front camera, determining whether at least one other vehicle image exists in the reflector, determining whether the at least one other vehicle is a preceding vehicle or an opposite vehicle through image analysis when the at least one other vehicle image exists in the reflector, generating a braking command when the at least one other vehicle is the preceding vehicle, and generating a steering torque for maintaining a lane when the at least one other vehicle is the opposite vehicle.

Generating the braking command may include generating the braking command only when a condition that a Time To Collision (TTC) with the preceding vehicle is smaller than preset N1 seconds is satisfied.

Generating the steering torque may include generating the steering torque only when both a condition that a Time To Collision (TTC) with the opposite vehicle is smaller than preset N2 seconds and a condition that a current driving vehicle deviates from the lane are satisfied.

The method may further include when the at least one other vehicle is the opposite vehicle, determining a type of the opposite vehicle through the image analysis and when the type of the opposite vehicle corresponds to a large truck, adjusting a value of N2 to a maximum value.

The method may further include when it is determined that both of the preceding vehicle and the opposite vehicle exist in the reflector, adjusting both a value of N1 and a value of N2 to a maximum value.

The method may further include displaying information on the preceding vehicle and/or the opposite vehicle recognized in the reflector on an instrument panel.

In another general aspect, an apparatus for preventing a blind spot collision includes: a camera configured to recognize a reflector installed on a road; an image analysis module configured to determine whether at least one other vehicle image exists in the reflector and to determine whether the at least one other vehicle is a preceding vehicle or an opposite vehicle through image analysis when the at least one another vehicle image exists in the reflector; and a controller configured to generate a braking command when the at least one other vehicle is the preceding vehicle and to generate a steering torque for maintaining a lane when the at least one other vehicle is the opposite vehicle.

The controller may be configured to generate the braking command only when a condition that a Time To Collision (TTC) with the preceding vehicle is smaller than preset N1 seconds is satisfied.

The controller may be configured to generate the steering torque only when both a condition that a Time To Collision (TTC) with the opposite vehicle is smaller than preset N2 seconds and a condition that a current driving vehicle deviates from the lane are satisfied.

When the at least one other vehicle is the opposite vehicle, the controller may be configured to determine a type of the opposite vehicle through the image analysis and, when the type of the opposite vehicle corresponds to a large truck, the controller may be configured to adjust a value of N2 to a maximum value.

When it is determined that both the preceding vehicle and the opposite vehicle exist in the reflector, the controller may be configured to adjust both a value of N1 and a value of N2 to a maximum value.

The apparatus may include an instrument panel configured to display information on the preceding vehicle and/or the opposite vehicle.

In another general aspect, a recording medium storing a program for preventing a blind spot collision stores a command for recognizing a reflector installed on a road using a front camera, determining whether at least one other vehicle image exists in the reflector, determining whether the at least one other vehicle is a preceding vehicle or an opposite vehicle through image analysis when the at least one another vehicle image exists in the reflector, generating a braking command when the at least one other vehicle is the preceding vehicle, and generating a steering torque for maintaining a lane when the at least one other vehicle is the opposite vehicle.

The recording medium may store a command for displaying information on the preceding and/or the opposite vehicle recognized in the reflector.

In another general aspect, a vehicle for preventing a blind spot collision includes: a sensor configured to recognize a reflector installed on a road; an image analysis module configured to determine whether at least one other vehicle image exists in the reflector and to determine whether the at least one other vehicle is a preceding vehicle or an opposite vehicle through image analysis when the at least one another vehicle image exists in the reflector; a controller configured to generate a braking command when the at least one other vehicle is the preceding vehicle and to generate a steering torque for maintaining a lane when the at least one other vehicle is the opposite vehicle; and a tire configured to change a direction and speed under control of the controller.

The vehicle may include a Head-Up Display (HUD) configured to display information on the preceding and/or the opposite vehicle recognized in the reflector.

Yet, according to one embodiment of the present disclosure, the meaning of recognizing the preceding vehicle or the opposite vehicle includes, for example, a case where an image of another vehicle in the reflector is detected or a case where it is determined as a dangerous situation.

In addition, the dangerous situation is limited to, for example, a case where an estimated time to collide with a vehicle to which the present disclosure is applied is within a preset time (for example, 2-3 seconds), through an image size and a change amount of another vehicle detected in the reflector.

In this specification, although information on the preceding vehicle or the counter vehicle recognized in the reflector is displayed on the instrument panel, it comes within the scope of another right of the present disclosure to design a warning sound to be outputted through a speaker or to design haptic vibration to be generated from a steering wheel.

Accordingly, the present disclosure provides various effects and/or advantages.

According to one of embodiments of the present disclosure, provided is a system for preventing collision in a sharp curve blind spot, in which a driver does not need to actually check a reflector.

According to one of embodiments of the present disclosure, there is a technical effect of providing a different algorithm depending on whether the other vehicle recognized in a reflector is a preceding vehicle or an opposite vehicle.

According to one of embodiments of the present disclosure, there is an advantage of adaptively changing a Time To Collison (TTC) in consideration of a type of another vehicle recognized in a reflector.

Effects obtainable from the present disclosure may be non-limited by the above-mentioned effect. And, other unmentioned effects can be clearly understood from the following description by those having ordinary skill in the technical field to which the present disclosure pertains. It is to be understood that both the foregoing general description and the following detailed description of the present disclosure are exemplary and explanatory and are intended to provide further explanation of the disclosure as claimed.

Other features and aspects will be apparent from the following detailed description, the drawings, and the claims.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings.

DETAILED DESCRIPTION

Hereinafter, embodiments of the present disclosure will be described in detail with reference to the accompanying drawings so that the present disclosure may be easily realized by those skilled in the art. However, the present disclosure may be achieved in various different forms and is not limited to the embodiments described herein. In the drawings, parts that are not related to a description of the present disclosure are omitted to clearly explain the present disclosure and similar reference numbers will be used throughout this specification to refer to similar parts.

In the specification, when a part "includes" an element, it means that the part may further include another element rather than excluding another element unless otherwise mentioned.

Figure 1:
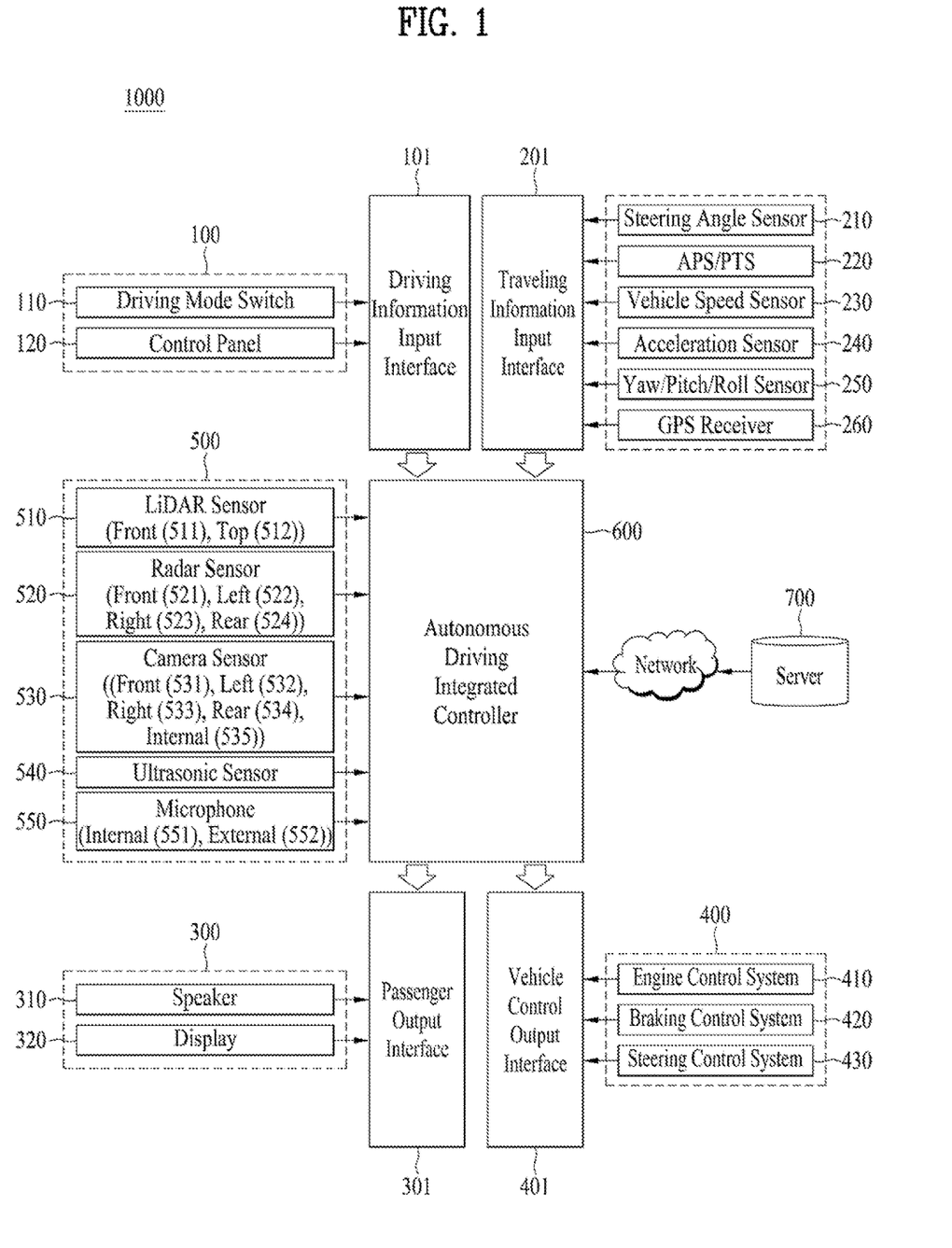
FIG. 1 is an overall block diagram of an autonomous driving control system to which an autonomous driving apparatus according to any one of embodiments of the present disclosure is applicable.
Figure 2:
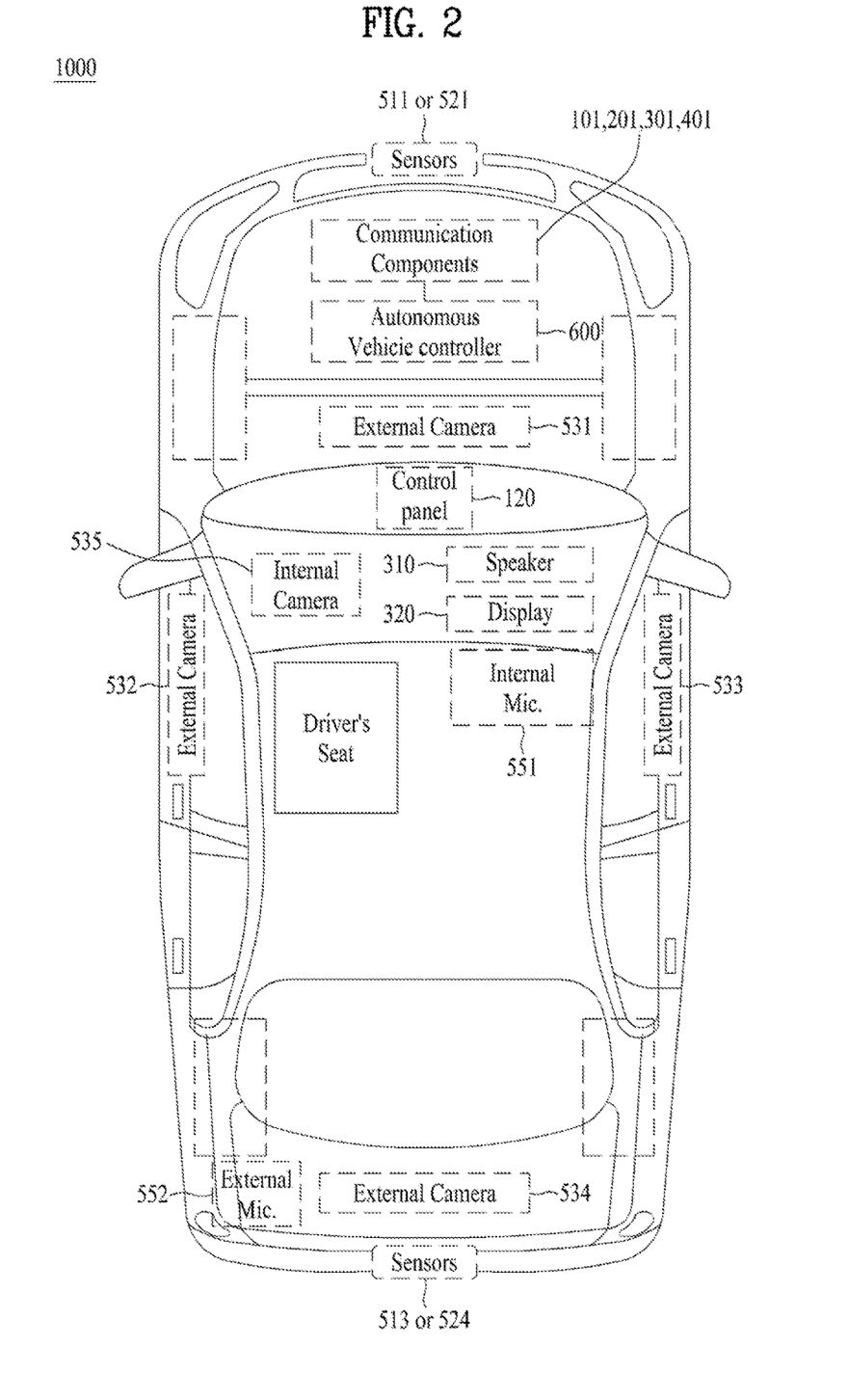
FIG. 2 is a diagram illustrating an example in which an autonomous driving apparatus according to any one of embodiments of the present disclosure is applied to a vehicle.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

In FIGS. 1 and 2, the vehicle equipped with an autonomous driving function has been exemplarily described as an embodiment of the present disclosure. However, the present disclosure may also be applied to a general vehicle having only a part of the autonomous driving function or no autonomous driving function at all.

Figure 3:
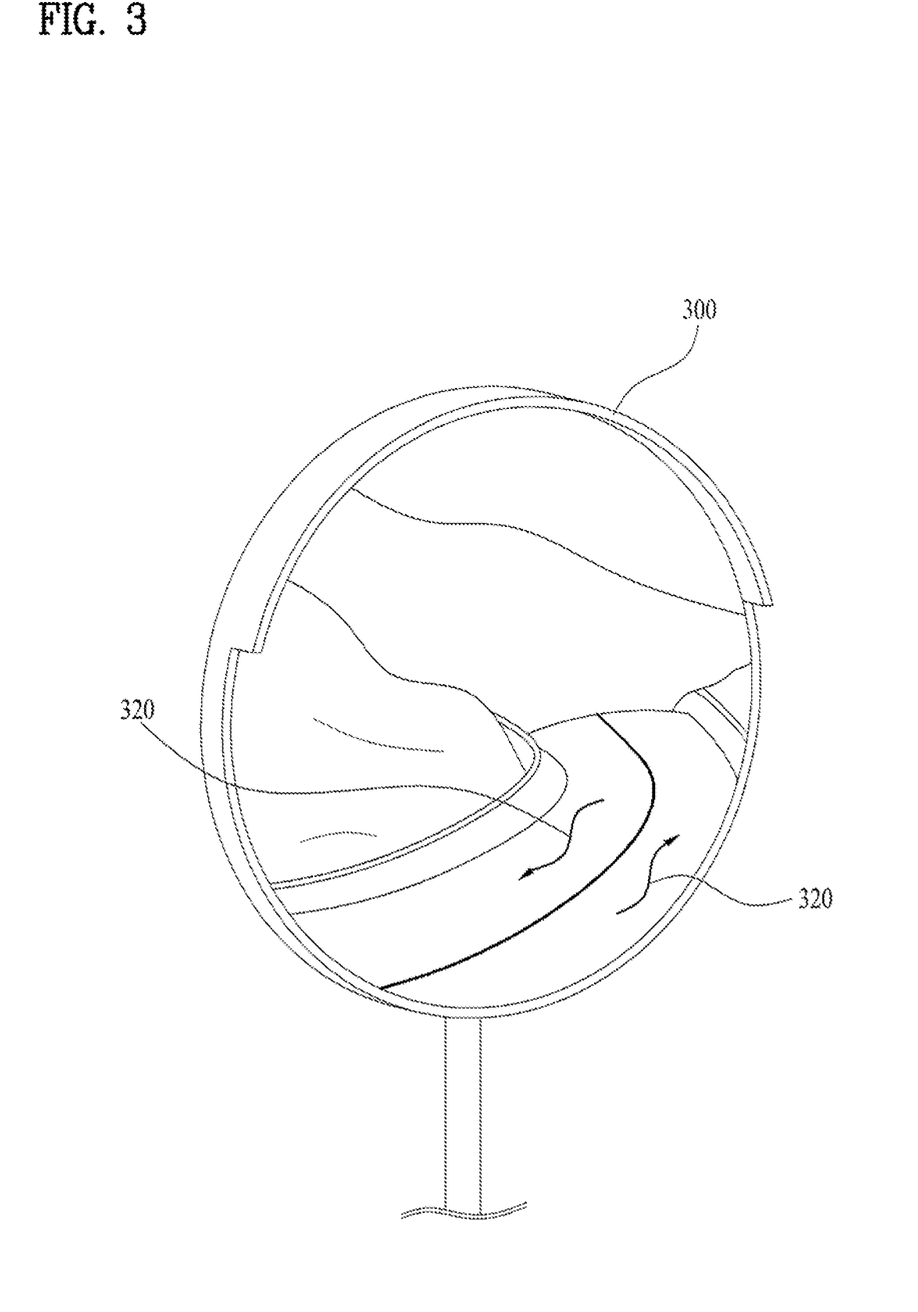
FIG. 3 is a diagram to describe information detected in a reflector according to one of embodiments of the present disclosure.

FIG. 3 is a diagram to describe information detected in a reflector according to one of embodiments of the present disclosure.

A vehicle according to one embodiment of the present disclosure includes the front camera sensor 531 illustrated in FIG. 1 and FIG. 2 as described above. Accordingly, it is possible to primarily detect a reflector 300 installed in a blind spot such as a sharp curve or the like.

In addition, the vehicle according to one embodiment of the present disclosure may analyze an image in the reflector 300 obtained through the front camera sensor 531 and determine a presence of a preceding vehicle 320 driving in the same lane and a presence of an opposite vehicle 310 driving in an opposite lane.

In the image obtained from the reflector 300, the preceding car may be distinguished from the opposite car based on a yellow centerline. When a rear side of a vehicle is recognized, the vehicle may be regarded as the preceding car. When a front side of a vehicle is recognized, the vehicle may be regarded as an opposite vehicle.

When an image size of an image recognized as a vehicle decreases according to a time flow, the vehicle may be regarded as a preceding vehicle. When an image size of an image recognized as a vehicle increases according to a time flow, the vehicle may be regarded as an opposite vehicle.

Meanwhile, according to one of the features of the present disclosure, as described above, a preceding vehicle and an opposite vehicle are identified through image analysis of other vehicles obtained from a reflector, and the possibility of a collision accident is reduced by applying different algorithms according to the identified types.

Figure 4:
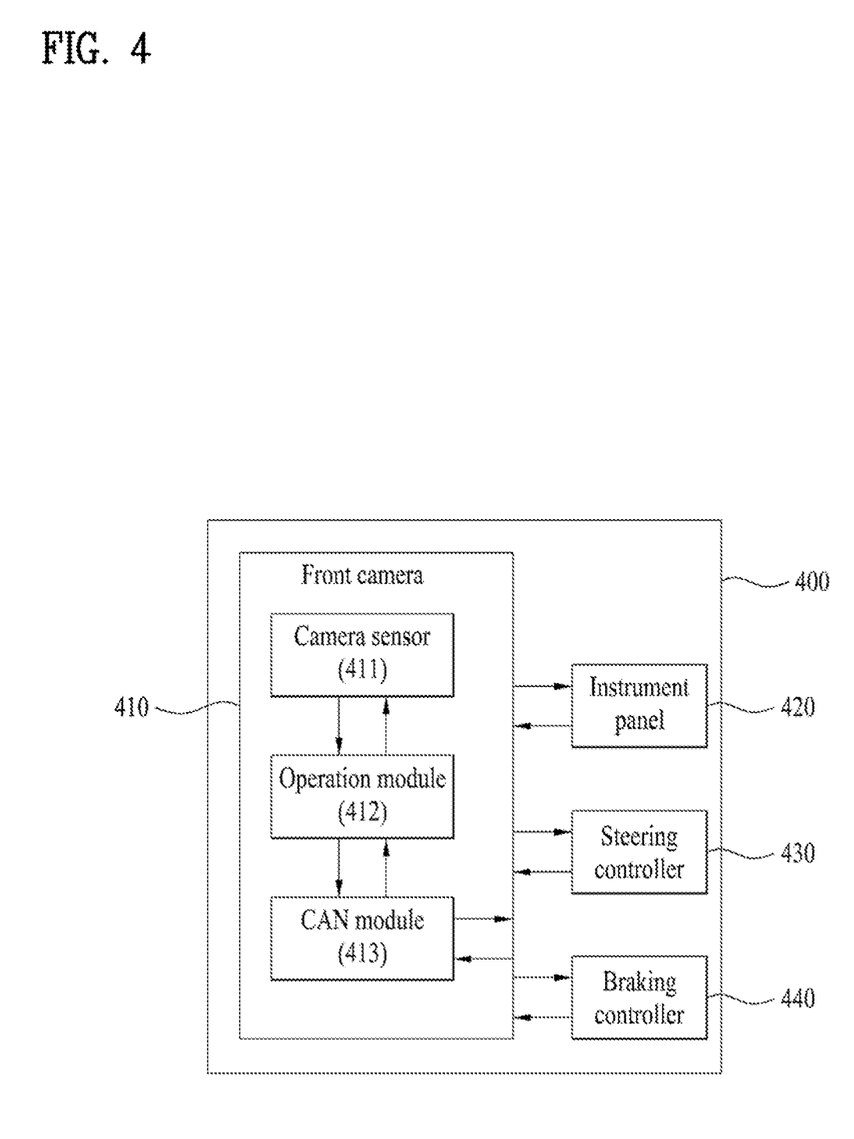
FIG. 4 is a block diagram showing main components of an apparatus for preventing a blind spot collision according to one of embodiments of the present disclosure.

FIG. 4 is a block diagram showing main components of an apparatus for preventing a blind spot collision according to one of embodiments of the present disclosure. An apparatus 400 shown in FIG. 4 may be mounted on a vehicle.

A front camera 410 shown in FIG. 4 includes a camera sensor 411, an operation module 412, and a Controller Area Network (CAN) module 413.

The camera sensor 411 is designed to primarily recognize a reflector located at a road corner, for example, and to secondarily recognize an image of another vehicle in the reflector.

The operation module 412 distinguishes whether another vehicle is a preceding vehicle or an opposite vehicle, selectively generates a braking command or a steering torque accordingly, and selectively transmits the braking command or the steering torque to a braking controller 440 or a steering controller 430.

Yet, it is also a feature of the present disclosure to transmit information on a presence of a vehicle in a blind spot to an instrument panel 420.

Meanwhile, communication between the front camera 410 and other components 420, 430 and 440 is performed, for example, through the CAN module 413. Yet, the application of other communication systems also falls within the scope of the present disclosure In other words, the apparatus 400 for preventing a blind spot collision will be described in more detail as follows.

The camera sensor 411 recognizes a reflector installed on a road.

The operation module 412 is designed to primarily determine whether at least one other vehicle image is present in the recognized reflector, and secondarily determine whether at least one other vehicle is a preceding vehicle or an opposite vehicle through image analysis when the at least one other vehicle image is present in the recognized reflector. A component performing such a function may be referred to as an image analysis module.

Meanwhile, when the at least one other vehicle is the preceding vehicle, the operation module 412 primarily generates a braking command and transmits the braking command to the braking controller 440 through the CAN module 413. When the at least one other vehicle is the opposite vehicle, the operation module 412 secondarily generates a steering torque to maintain a lane and transmits it to the steering controller 430 through the CAN module 413. A component that performs such a function may be referred to as a controller.

The operation module 412 or the controller may be designed to generate the braking command only when a condition that a Time-To-Collision (TTC) with the preceding vehicle is smaller than predetermined N1 seconds (sec) is satisfied.

It is also within the scope of the present disclosure to design the operation module 412 or the controller to generate the steering torque only when both a condition in which a Time-TO-Collision (TTC) with the opposite vehicle is smaller than predetermined N2 seconds (sec.) and a condition in which a current driving vehicle deviates from a lane are satisfied.

When the at least one other vehicle is the opposite vehicle, the operation module 412 or the controller preferentially determines a type of the opposite vehicle through image analysis. In addition, when the determined type of the opposite vehicle corresponds to a large truck, the value of N2 is adjusted to a maximum value (Max).

The operation module 412 or the controller is characterized in adjusting both the value of N1 and the value of N2 to maximum values (Max) when it is recognized that both of the preceding vehicle and the opposite vehicle are present in the reflector.

Then, the instrument panel 420 displays information on the preceding vehicle or the opposite vehicle recognized in the reflector.

Meanwhile, embodiments of the present disclosure described in the previous drawings will be described in a time series manner with reference to FIG. 5. Yet, deleting, adding, and changing some of the components shown in FIG. 5 fall within the scope of other rights of the present disclosure, and of course, in principle, the scope of rights should be determined according to matters described in the claims.

Figure 5:
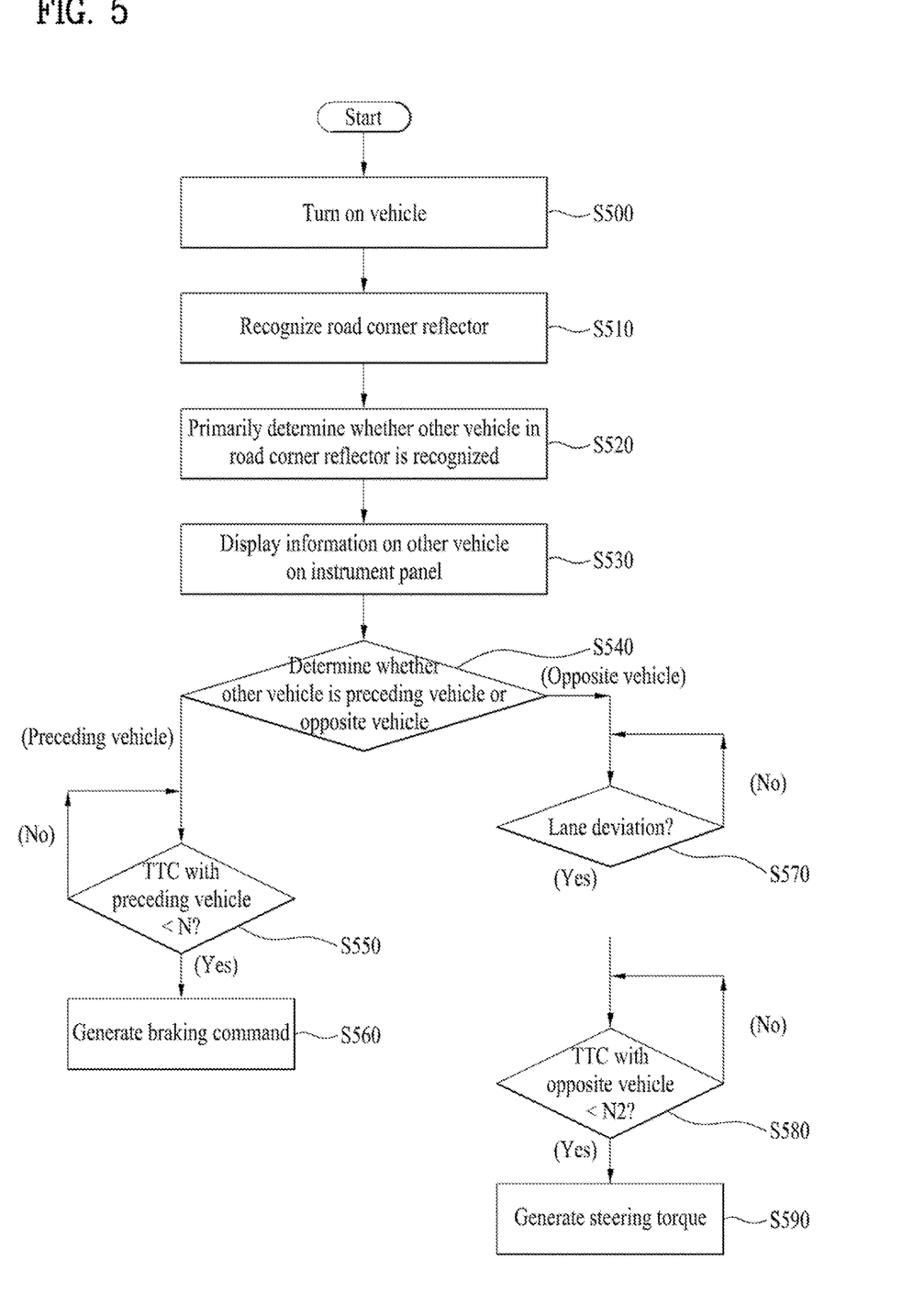
FIG. 5 is a flowchart showing a method of preventing a blind spot collision in a time series according to one of embodiments of the present disclosure.

FIG. 5 is a flowchart showing a method of preventing a blind spot collision in a time series according to one of embodiments of the present disclosure.

A method of preventing a blind spot collision shown in FIG. 5 may be partially or entirely implemented in a vehicle.

First, assume a situation in which driving is being performed after a vehicle has been turned on (S500).

In this case, the vehicle according to one embodiment of the present disclosure invention recognizes a reflector installed on the road using a front camera (S510) and primarily determines whether at least one other vehicle image exists in the recognized reflector (S520). Of course, it will be said that using another sensor instead of the front camera falls within the scope of other rights of the present disclosure.

Furthermore, the vehicle according to one embodiment of the present disclosure displays information on a preceding vehicle or an opposite vehicle recognized in the reflector on an instrument panel (S530). Of course, it is also possible to display a blind spot vehicle through a Head-Up Display (HUD).

When at least one other vehicle image exists in the recognized reflector, the vehicle according to one embodiment of the present disclosure is designed to secondarily determine whether the at least one other vehicle is a preceding vehicle or an opposite vehicle through image analysis (S540).

As a result of the determination (S540), when the at least one other vehicle is the preceding vehicle, a braking command is primarily generated (S560). However, in order to solve a problem in which a braking command is generated too often even though it is not a dangerous situation, it falls within another scope of other rights of the present disclosure to additionally design the step S560 to be performed only when a condition that a Time To Collision (TTC) with the preceding vehicle is smaller than the preset N1 seconds (sec.) is additionally satisfied (S550).

As a result of the determination (S540), when the at least one other vehicle is the opposite vehicle, a steering torque for maintaining a lane is secondarily generated (S590). However, in order to prevent the steering torque from being generated too often even though it is not a dangerous situation, it may fall within the scope of another right of the present disclosure to additionally design the step S590 to be performed only when both a condition that a Time To Collision (TTC) with the opposing vehicle is smaller than the preset N2 seconds (sec.) and a condition that a driving vehicle currently deviates from a lane are satisfied.

The N1 and N2 described above may be the same or different, and may be initially set to a time of, for example, about 1.5 to 3 seconds.

Yet, according to another embodiment of the present disclosure, there is an advantage in that the probability of an accident may be further lowered by adaptively adjusting the N value according to the type of another vehicle recognized in the reflector. In order to implement this, the database shown in Table 1 below is designed to be stored in an in-vehicle memory or a server.

TABLE 1

| Type of another vehicle recognized in reflector | Whether to adjust N value |
| --- | --- |
| Preceding vehicle present only | Not adjust N1 value. |
| Both preceding vehicle and opposite vehicle present | Adjust both N1 and N2 to Max value (e.g., 3 seconds). |
| Opposite vehicle present only | Adjust N2 value to Max value only when an opposite vehicle is a truck. |

For example, when another vehicle recognized in the reflector is an opposite vehicle, the vehicle according to one embodiment of the present disclosure additionally determines the type of the opposite vehicle through image analysis. In addition, when the determined type of the opposite vehicle corresponds to a large truck, the vehicle according to one embodiment of the present disclosure is designed to adjust the value of N2 to a maximum value (Max). Accordingly, a technical effect of making the timing of automatically controlling steering faster is expected.

On the other hand, when it is recognized that both the preceding vehicle and the opposite vehicle are present in the reflector, both the braking control and the steering control timing may be performed as quickly as possible by adjusting both the value of N1 and the value of N2.

In another aspect of the present disclosure, the above-described proposal or operation of the present disclosure may be provided as codes that may be implemented, embodied or executed by a "computer" (System on Chip (SoC)), an application storing or containing the codes, a computer-readable storage medium, a computer program product, and the like, which also comes within the scope of the present disclosure.

For example, a recording medium storing a program for preventing a blind spot collision of a vehicle stores a command for recognizing a reflector installed on a road using a front camera, primarily determining whether at least one another vehicle image exists in the recognized reflector, secondarily determining whether the at least one another vehicle is a preceding vehicle or an opposite vehicle through image analysis when the at least one another vehicle image exists in the recognized reflector, primarily generating a braking command when the at least one another vehicle is the preceding vehicle, and secondarily generating a steering torque for maintaining a lane when the at least one another vehicle is the opposite vehicle. Therefore, an implementer implementing a program for implementing the present disclosure in software corresponds to an infringement.

On the other hand, a vehicle according to one embodiment of the present disclosure includes a sensor (e.g., a front camera, etc.) recognizing a reflector installed on a road, an image analysis module primarily determining whether at least one another vehicle image exists in the recognized reflector and secondarily determining whether the at least one another vehicle is a preceding vehicle or an opposite vehicle through image analysis when the at least one another vehicle image exists in the recognized reflector, a controller primarily generating a braking command when the at least one another vehicle is the preceding vehicle and secondarily generating a steering torque for maintaining a lane when the at least one another vehicle is the opposite vehicle, and a tire changing a direction and speed under control of the controller. Therefore, an implementer implementing the present disclosure in the form of a complete vehicle also corresponds to an infringement.

A detailed description of preferred embodiments of the present disclosure disclosed as described above is provided so that those skilled in the art can implement and embody the present disclosure. Although the description is made with reference to the preferred embodiments of the present disclosure, it will be appreciated by those skilled in the art that various modifications and variations can be made in the present disclosure without departing from the spirit or scope of the disclosures. For example, those skilled in the art may use the respective components described in the above-described embodiments in a manner of combining them with each other.

Therefore, the present disclosure is not intended to be limited to the embodiments shown herein, but to give the broadest scope that matches the principles and novel features disclosed herein.

What is claimed is:

1. A method of preventing a blind spot collision, the method comprising:
   recognizing a traffic mirror installed on a road using a front camera;
   determining whether at least one other vehicle image exists in the traffic mirror;
   determining whether the at least one other vehicle is a preceding vehicle or an opposite vehicle through image analysis when the at least one other vehicle image exists in the traffic mirror;
   generating a braking command when the at least one other vehicle is the preceding vehicle, wherein generating the braking command comprises generating the braking command only when a condition that a first Time To Collision (TTC) with the preceding vehicle is smaller than preset N1 seconds is satisfied; and generating a steering torque for maintaining a lane when the at least one other vehicle is the opposite vehicle, wherein generating the steering torque comprises generating the steering torque only when both a condition that the a second Time To Collision (TTC) with the opposite vehicle is smaller than preset N2 seconds and a condition that a current driving vehicle deviates from the lane are satisfied.

2. The method of claim 1, further comprising:

when the at least one other vehicle is the opposite vehicle, determining a type of the opposite vehicle through the image analysis; and when the type of the opposite vehicle corresponds to a large truck, adjusting a value of the N2 to a maximum value.

3. The method of claim 1, further comprising:

when it is determined that both of the preceding vehicle and the opposite vehicle exist in the traffic mirror, adjusting both a value of N1 and a value of N2 to a maximum value.

4. The method of claim 1, further comprising displaying information on the preceding vehicle and/or the opposite vehicle on an instrument panel.

5. An apparatus for preventing a blind spot collision, the apparatus comprising:

a camera configured to recognize a traffic mirror installed on a road;

an image analysis module configured to determine whether at least one other vehicle image exists in the traffic mirror and to determine whether the at least one other vehicle is a preceding vehicle or an opposite vehicle through image analysis when the at least one another vehicle image exists in the traffic mirror; and a controller configured to:
  generate a braking command when the at least one other vehicle is the preceding vehicle, wherein the controller is configured to generate the braking command only when a condition that a first Time To Collision (TTC) with the preceding vehicle is smaller than preset N1 seconds is satisfied;
  generate a steering torque for maintaining a lane when the at least one other vehicle is the opposite vehicle, wherein the controller is configured to generate the steering torque only when both a condition that a second TTC with the opposite vehicle is smaller than preset N2 seconds and a condition that a current driving vehicle deviates from the lane are satisfied.

6. The apparatus of claim 5, wherein when the at least one other vehicle is the opposite vehicle, the controller is configured to determine a type of the opposite vehicle through the image analysis and, when the type of the opposite vehicle corresponds to a large truck, the controller is configured to adjust a value of N2 to a maximum value.

7. The apparatus of claim 5, wherein when it is determined that both the preceding vehicle and the opposite vehicle exist in the traffic mirror, the controller is configured to adjust both a value of N1 and a value of N2 to a maximum value.

8. The apparatus of claim 5, further comprising an instrument panel configured to display information on the preceding vehicle and/or the opposite vehicle.

9. A vehicle for preventing a blind spot collision, the vehicle comprising:

a sensor configured to recognize a traffic mirror installed on a road;

an image analysis module configured to determine whether at least one other vehicle image exists in the traffic mirror and to determine whether the at least one other vehicle is a preceding vehicle or an opposite vehicle through image analysis when the at least one another vehicle image exists in the traffic mirror;

a controller configured to:
  generate a braking command when the at least one other vehicle is the preceding vehicle, wherein the controller is configured to generate the braking command only when a condition that a first Time To Collision (TTC) with the preceding vehicle is smaller than preset N1 seconds is satisfied; and
  generate a steering torque for maintaining a lane when the at least one other vehicle is the opposite vehicle, wherein the controller is configured to generate the steering torque only when both a condition that a second TTC with the opposite vehicle is smaller than preset N2 seconds and a condition that a current driving vehicle deviates from the lane are satisfied; and a tire configured to change a direction and speed under control of the controller.

10. The vehicle of claim 9, wherein when the at least one other vehicle is the opposite vehicle, the controller is configured to determine a type of the opposite vehicle through the image analysis and, when the type of the opposite vehicle corresponds to a large truck, the controller is configured to adjust a value of N2 to a maximum value.

11. The vehicle of claim 9, wherein when it is determined that both of the preceding vehicle and the opposite vehicle exist in the traffic mirror, the controller is configured to adjust both a value of N1 and a value of N2 to a maximum value.

12. The vehicle of claim 9, further comprising a Head-Up Display (HUD) configured to display information on the preceding and/or the opposite vehicle recognized in the traffic mirror.

* * * * *